United States Patent [19]

Lyman

[11] Patent Number: 5,425,249
[45] Date of Patent: Jun. 20, 1995

[54] BOTTOM FEED A/C ACCUMULATOR WITH BLOCKING VALVE

[75] Inventor: Tommy L. Lyman, Piqua, Ohio

[73] Assignee: General Motors Corporation, Detroit, Mich.

[21] Appl. No.: 247,196

[22] Filed: May 20, 1994

[51] Int. Cl.⁶ .............................................. F25B 43/02
[52] U.S. Cl. ........................................ 62/471; 62/503
[58] Field of Search .............. 62/503, 192, 193, 468, 62/470, 471

[56] References Cited

U.S. PATENT DOCUMENTS

| | | | |
|---|---|---|---|
| 3,412,574 | 11/1968 | Reiter | 62/471 |
| 3,563,053 | 2/1971 | Bottum | 62/503 |
| 3,827,255 | 8/1974 | Kish | 62/296 |
| 4,266,405 | 5/1981 | Trask | 62/160 |
| 5,052,193 | 10/1991 | Pettitt et al. | 62/503 |
| 5,347,829 | 9/1994 | Newman | 62/503 X |

Primary Examiner—Harry B. Tanner
Attorney, Agent, or Firm—Patrick M. Griffin

[57] ABSTRACT

A bottom feed accumulator canister for an automotive air conditioning system includes a novel means to prevent drain down when the system compressor is off. A valve chamber located at the bottom of, and to one side of, the accumulator return tube surrounds a small bleed orifice through the tube. A valve seat in the valve chamber holds a weight that is sufficiently massive to block the valve seat against liquid ingress when the compressor is off. When the compressor is on, the suction at the bottom of the return tube is also seen in the valve chamber, lifting the weight so that liquid can be drawn into the tube through the small orifice.

2 Claims, 2 Drawing Sheets

BOTTOM FEED A/C ACCUMULATOR WITH BLOCKING VALVE

This invention relates to automotive air conditioning system accumulators in general, and specifically to a bottom feed accumulator with a novel blocking valve to prevent drain down when the compressor is not operating.

BACKGROUND OF THE INVENTION

Vehicle air conditioning systems include an evaporator from which refrigerant in a vapor-liquid mixture, including entrained lubricant, flows as the system operates. It is pulled from the evaporator under substantial suction by the compressor. With compressors of the fixed displacement type, that suction pressure remains high the entire time that the compressor is engaged. Because the compressor does not operate well if liquid refrigerant is drawn directly into it, an accumulator is interposed between the evaporator and compressor. The accumulator is typically a hollow cylinder, vertically mounted beneath the vehicle hood, with an inlet from the evaporator opening directly into the canister at a high point. The outlet to the compressor from the canister is indirect, through a return tube internal to the canister. The return tube has one end located just below the top of the canister, and the other end exits the canister and is connected directly to the compressor suction. Refrigerant-lubricant mixture entering the canister fills the canister from the bottom up, leaving a vapor space at the top, surrounding the open end of the return tube. Compressor suction is therefore applied to the vapor space, and vaporous refrigerant is drawn out. The accumulated liquid refrigerant and lubricant is drawn into the return tube through a small diameter metering orifice located near the bottom end of the canister, and effectively atomized, so that dense liquid does not enter the compressor.

The shape of the return tube within the canister is dictated by underhood space and compressor line routing. Ideally, the return tube will be able to exit the canister from a high point, comparable to the inlet. If so, the return tube can be given a U shape, with the bend or bight of the U located near the bottom of the canister, incorporating the bleed orifice. This gives the advantage of acting like a sink trap, and preventing drain down through the orifice into the compressor when the compressor is not operating. In some circumstances, the only feasible exit point for the return tube is out the bottom of the canister, usually the bottom center. In that case, the return tube is straight, not U shaped, and there is no sink trap effect. The bleed orifice still must be near the bottom of the return tube, so it is possible for liquid to drain down through the orifice, small as it is, given enough time. One possible solution to this problem is disclosed in co-assigned U.S. patent application Ser. No. 08/148,236, U.S. Pat. No. 5,347,829. There, a novel return tube has a closely packed bent shape which places a sink trap type bend inside the canister, even though the exit to the compressor is through the bottom of the canister. Therefore, drain down is prevented. However, that particular return tube may not fit in all bottom feed canisters.

Another possible solution to drain down in a bottom feed accumulator is disclosed in co pending, co assigned U.S. application Ser. No. 08/130,399, filed Oct. 1, 1993. Instead of a bleed orifice near the lower end of the straight return tube, a separate, small diameter pick up tube runs parallel to the return tube from a pick up point at the bottom of the canister and into the return tube at a high point. Compressor suction acts through the pick up tube to draw out accumulated liquid. When the system is off, liquid can accumulate to a height equal to the point where the pick up tube enters the return tube, without draining into the return tube. Not all compressors may provide enough suction to act through the entire length of the thin pick up tube, however.

SUMMARY OF THE INVENTION

The invention provides a drain down prevention means for a conventional, straight return tube type of bottom feed type accumulator in which accumulated liquid still enters the return tube through a small bleed orifice near the bottom of the canister, but does so indirectly, through a blocking valve. A compact valve chamber secured to the outer surface of the return tube covers the bleed orifice and opens to the inside of the canister through a larger diameter circular seat, which lies in a horizontal plane. A spherical weight inside the valve chamber sits down in and partially through the valve seat. The weight is carefully sized so as to be just heavy enough to hold back the expected height of accumulated liquid, so drain down is prevented while the compressor is off. When the compressor is operating, substantial suction pressure is applied to the bottom end of the return tube, which is also seen inside the valve chamber. The upward pull of the compressor suction, plus the upward pressure of the head of accumulated liquid, combine to lift the ball from the seat, so that liquid can be atomized into the return tube through the small bleed orifice.

DESCRIPTION OF THE PREFERRED EMBODIMENT

These and other features will appear from the following written description of the invention, and from the drawings, in which.

Figure 1:
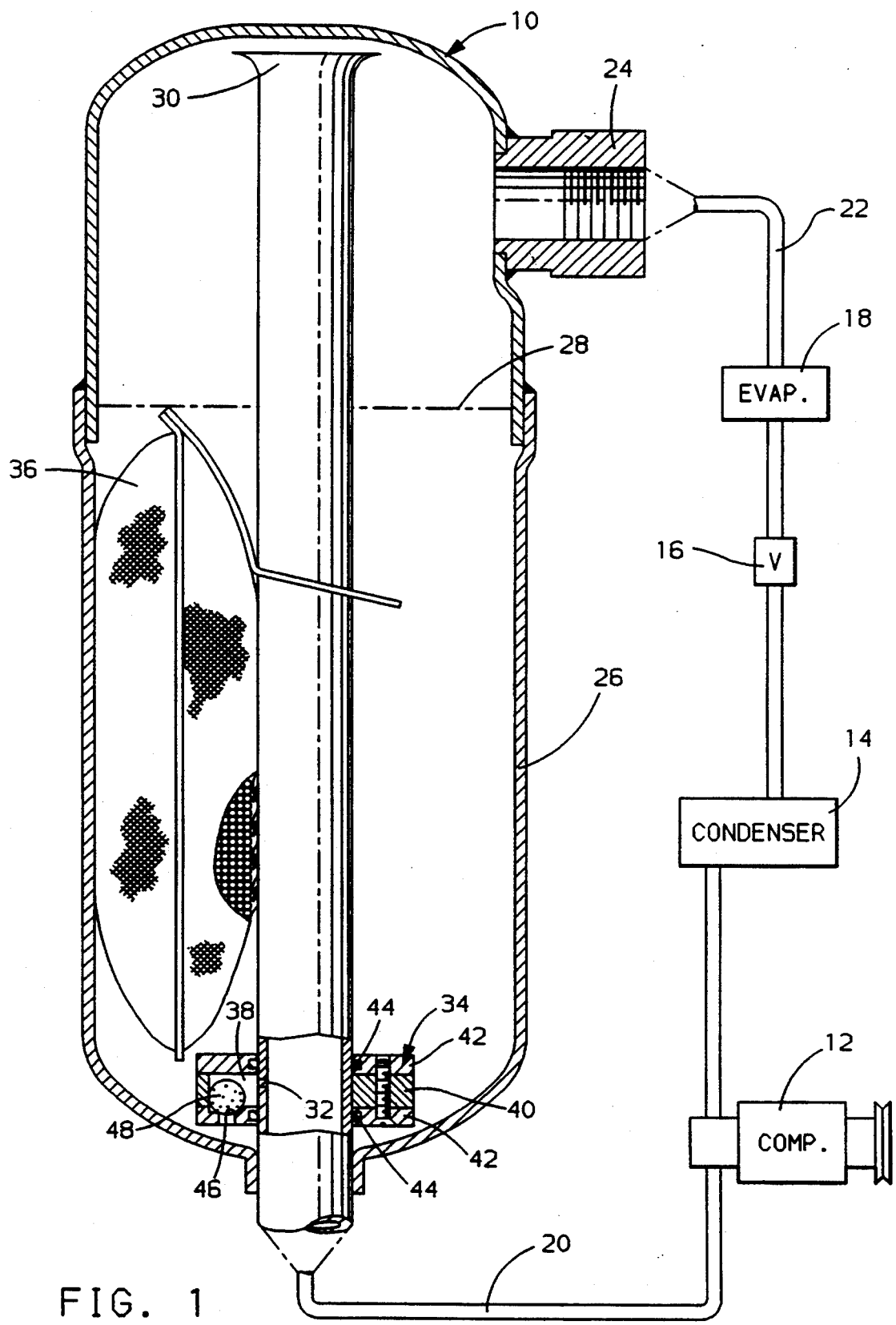
FIG. 1 is a schematic view of an automotive air conditioning system, showing a cross section through an accumulator canister and showing part of the blocking valve broken away.

Referring first to FIG. 1, a preferred embodiment of the accumulator of the invention, indicated generally at 10, is shown in conjunction with an automotive air conditioning system. The system comprises a compressor 12, condenser 14, expansion valve 16 and evaporator 18. A suction line 20 runs from compressor 12 to the bottom of the accumulator 10, while an inlet line 22 runs from evaporator 18 into accumulator 10 through a fitting 24. Accumulator 10's basic structure is a hollow aluminum canister 26, which is generally cylindrical, and made up of two interfitting halves that are welded together. Canister 26 is mounted with its central axis vertical to the car body, so that the liquid portion of the refrigerant mixture that enters can accumulate and rise to a level indicated at 28. The accumulated liquid 28 does not drain out for two basic reasons. First, direct entry into compressor suction line 20 is prevented by a straight return tube 30, which reaches almost to the top of canister 26. Liquid 28 will normally never rise high enough to run over the top of return tube 30, and is continually pulled out in controlled fashion through a bleed orifice 32, which is further described below. Second, direct entry of liquid 28 into orifice 32 is prevented by the blocking valve of the invention, indicated generally at 34, described in detail below. The only other component within canister 26 is a desiccant bag 36, clipped to tube 30, which adsorbs moisture from the accumulated liquid 28.

Figure 2:
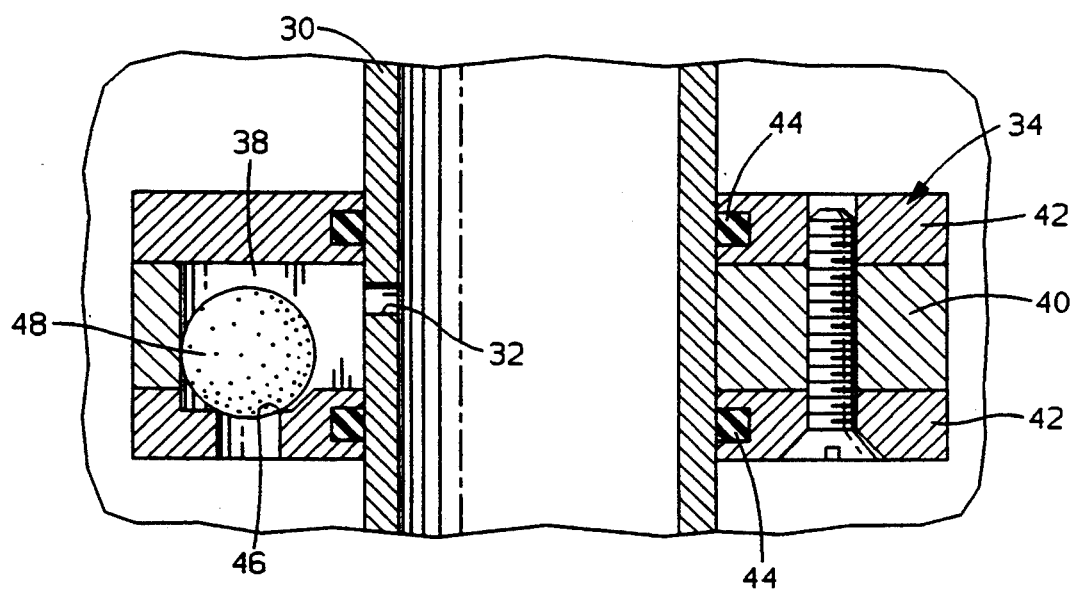
FIG. 2 is an enlargement of the blocking valve in a closed position, when the compressor is not operating.
Figure 4:
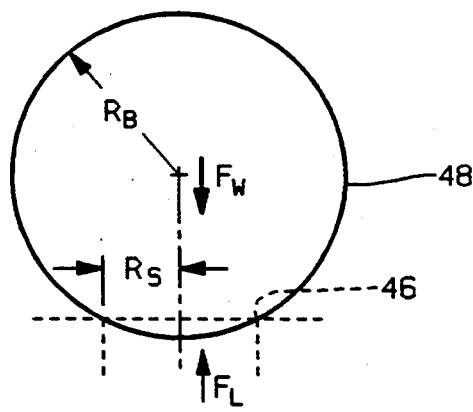
FIG. 4 is a free body diagram of the spherical weight in its static, closed position.

Referring next to FIGS. 2 and 4, the structural details of blocking valve 34 are described. A valve chamber or space 38 is created by a cutout in a plate 40 which, in turn, is sandwiched between a pair of disks 42 that fit over return tube 30, bordering the orifice 32. A pair of O rings 44 seal chamber 38 against leaks along the tube 30. The only entry into chamber 38 is through a circular valve seat 46, which has a radius $R_S$ of approximately 0.0466 inches in the embodiment disclosed. Since the canister 26 is vertically mounted, the edge of seat 46 lies in a horizontal plane. Sitting in seat 46 is a spherical weight in the form of a solid aluminum ball 48 with a radius $R_B$ diameter of approximately 0.125 inches. As it sits, a section of the surface of ball 48, small enough that its area projected into the plane of seat 46 can be considered essentially flat, is exposed below seat 46 to the liquid 28. The rest of ball 48 is exposed to the interior of chamber 38 and, indirectly, to the inside of tube 30 and canister 26, through orifice 32.

Still referring to FIGS. 2 and 4, the operation of valve 34 in the static, closed condition are described. Generally stated, in order for valve 34 to prevent drain down, the force $F_L$ with which the liquid 28 pushes up on ball 48 must be less than or equal to the force $F_W$ with which ball 48 pushes down on liquid 28, shown by arrows in FIG. 4. The internal canister pressure in the open vapor space above the surface of liquid 28 can be ignored, since it pushes up and down on ball 48 equally. $F_L$ results from the pressure of the head of liquid 28 acting up on the exposed undersurface of ball 48, which area is basically the same as the area of the valve seat 46. The location of valve seat 46 is indicated by a dotted line in FIG. 4. The liquid pressure is a function of the height and density of liquid 28, and is at a maximum at the maximum accumulated liquid height, which, here, can be expected to reach about 5.9 inches. $F_W$ is a function of the weight of ball 48, which in turn is a function of its density and volume. Setting the two forces equal at the maximum expected height of liquid 28 assures that ball 48 can always hold, and gives a relationship between the size of ball seat 46 and ball 48. Specifically, $F_L = \rho_L * g * h * \pi * R_S^2$, where h is the height of accumulated liquid 28, $\rho_L$ its density, and g the acceleration due to gravity. $F_W = \rho_B * 4/3\pi * R_B^3 * g$, where $\rho_B$ is the density of ball 48 and $R_B$ its radius. Equating the two and dividing out common factors, one obtains the relation $\rho_L * h * R_S^2 = \rho_B * 4/3 * R_B^3$. What the designer can do next is, given the values for expected maximum height of the accumulated liquid 28, choose a material and size for ball 48, and then size the seat 46 accordingly. For the embodiment disclosed, $\rho_L$ is 117.0 lb/ft$^3$, and $\rho_B$ is 576.0 lb/ft$^3$, since aluminum was chosen. The ball size chosen was a 0.125 radius. Substituting those three values allows the radius of seat 46 to be calculated, which is 0.0466 inches, as noted above. A heavier metal for ball 48, given the same size, would allow a smaller radius for seat 46. However, too small a radius for seat 46 would mean that ball 48 would not sit down in it with as much stability.

Figure 3:
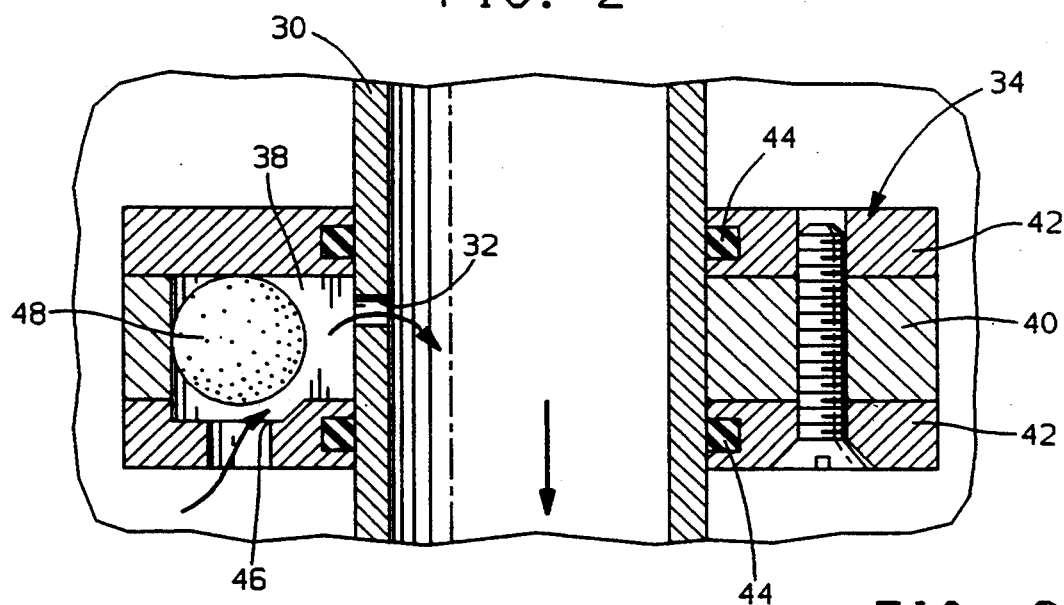
FIG. 3 shows the blocking valve open, when the compressor is operating.

Referring next to FIG. 3, the open position of valve 34 is illustrated. No specific formula can be given for the dynamic case, when compressor 12 is operating, as was done for the static condition. However, there will always be a differential in pressure between the top and bottom of tube 30, with the pressure at the bottom being lower due to the suction of compressor 12. That suction will also be seen within chamber 38, through orifice 32. The designer would have to empirically determine whether the suction would be sufficient to lift ball 48 in any particular case. Here, the expected differential in pressure is approximately 0.4 psi, which is sufficient to lift ball 48, and it is expected that most fixed displacement compressors would work. When valve 34 is open, accumulated liquid 28 is drawn through the small orifice 32, which will tend to atomize it as it is pulled continually into tube 30 and ultimately into compressor 12. The ball seat 46 is large enough not to present any additional restriction to flow through orifice 32. Since orifice 32 is so small, and since the outer surface of tube 30 is curved, ball 48 will not block it. The height of liquid 28 existing at any point during the operation of compressor 12, while it will assist the lifting of ball 48, does not correlate to the suction of compressor 12, and could be any height. Therefore, the pressure depression created by compressor 12 must be sufficient to lift ball 48 even if the liquid height is very low.

Just as important to understanding how valve 34 operates is to consider some alternate valve means. Valve 34 provides a blocking valve, but does not operate as a conventional ball check valve. A conventional check valve would be located directly within tube 30 or suction line 20. This would be ineffective, however, since refrigerant would still back up behind an in line check valve, and would be immediately pulled in when the compressor 12 switched on. The location of valve 34 not directly in line with, but off to the side of tube 30, allows it to operate in parallel, and keeps liquid substantially out of tube 30. Furthermore, the particular location of ball 48 and orifice 32 in relation to the open upper end of return tube 30 gives an effect somewhat like a Pitot-Static tube as vapor rushes down tube 30 and past the small orifice 32, creating an additional pressure depression within chamber 38 to help lift ball 48. Therefore, the unconventional, offset location of ball 48 provides several advantages.

Some variations in the disclosed embodiment could be made. Fundamentally, a properly sized weight of whatever shape sitting in a valve seat, exposed below to the liquid column and above to the compressor suction, would serve as a blocking valve. The spherical weight 48 disclosed is far simpler to machine, as is the round seat 46, which can simply be drilled through disk 42. Balls like 48 are often available as off the shelf items. The particular size, material and weight of ball 48 is only an example. Given the formula above, a spread sheet could be computer generated giving a whole range of ball seat sizes in terms of various ball weights and sizes. A light downward spring load could be given to assist the closing of ball 48, but that would not be preferred, as it adds complexity, and is more often associated with a conventional ball check valve. The chamber 38 could be integrally formed with tube 30. The disks 42 provide a convenient retro fit, since they fit over tube 30 with no modification, are easily sealed and are compact, fitting entirely beneath desiccant bag 36.

By sandwiching the relieved central plate 40, the disks 42 conveniently create the valve chamber 38 and allow sphere 48 to be easily added. Therefore, it will be understood that it is not intended to limit the invention to the preferred embodiment disclosed.

The embodiments of the invention in which an exclusive property or privilege are claimed are defined as follows:

1. In an automotive air conditioning system of the type having an evaporator from which a mixture of vaporous and liquid refrigerant flows and a compressor to which it flows under substantial suction pressure when said compressor is operating, an accumulator interposed between said evaporator and compressor, comprising, a hollow, vertically mounted canister with an evaporator inlet near the top thereof, a return tube running vertically through said canister having an open upper end near the top center of said canister and a lower end exiting the bottom center of said canister and subject to compressor suction when said compressor is operating and subject to internal canister pressure when said compressor is not operating, so that liquid refrigerant entering said inlet may settle out in said canister and rise to a liquid height within said canister comparable to the height of said return tube upper end, a valve chamber located within said canister near the lower end of said return tube and external to said return tube, said valve chamber having a relatively small diameter bleed orifice opening into said return tube and a horizontally disposed valve seat opening into said canister interior, and, a weight seated on said circular valve seat so that an exterior surface thereof is exposed to said accumulated liquid and an interior surface thereof is exposed to the interior of said return tube, through said orifice, said weight having sufficient mass to resist the upward pressure of said liquid height, whereby, when said compressor is not operating, said valve seat is blocked and accumulated liquid does not enter said return tube, and when said compressor is operating, said weight is exposed to compressor suction pressure and is raised from said valve seat so as to meter accumulated liquid into said return tube through said orifice.

2. In an automotive air conditioning system of the type having an evaporator from which a mixture of vaporous and liquid refrigerant flows and a compressor to which it flows under substantial suction pressure when said compressor is operating, an accumulator interposed between said evaporator and compressor, comprising, a hollow, vertically mounted canister with an evaporator inlet near the top thereof, a return tube running vertically through said canister having an open upper end near the top center of said canister and a lower end exiting the bottom center of said canister and subject to compressor suction when said compressor is operating and subject to internal canister pressure when said compressor is not operating, so that liquid refrigerant entering said inlet may settle out in said canister and rise to a liquid height within said canister comparable to the height of said return tube upper end, a valve chamber located within said canister near the lower end of said return tube and external to said return tube, said valve chamber having a relatively small diameter bleed orifice opening into said return tube and a circular, horizontally disposed valve seat opening into said canister interior, and, a spherical weight seated within said circular valve seat so that an exterior surface thereof is exposed to said accumulated liquid and an interior surface thereof is exposed to the interior of said return tube, through said orifice, said weight having sufficient mass to resist the upward pressure of said liquid height, whereby, when said compressor is not operating, said valve seat is blocked and accumulated liquid does not enter said return tube, and when said compressor is operating, said weight is exposed to compressor suction pressure and is raised from said valve seat so as to meter accumulated liquid into said return tube through said orifice.

* * * * *